July 6, 1965 — L. O. DOWNES — 3,193,061
STRUCTURAL PARTITION SYSTEM
Filed June 8, 1962 — 5 Sheets-Sheet 1
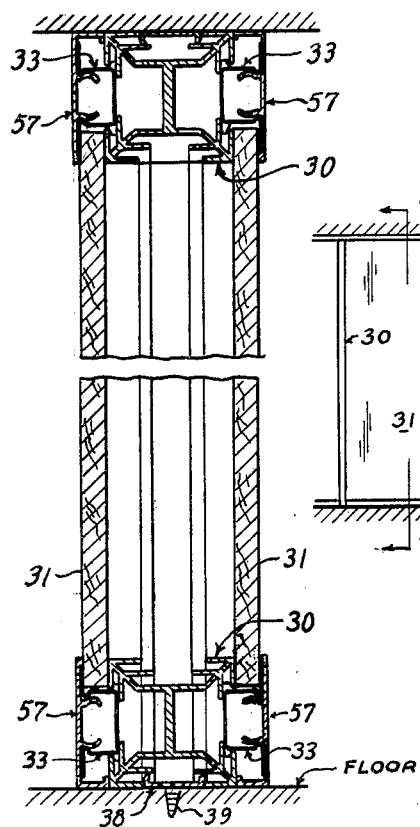
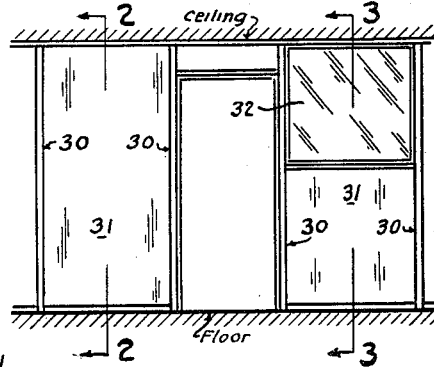
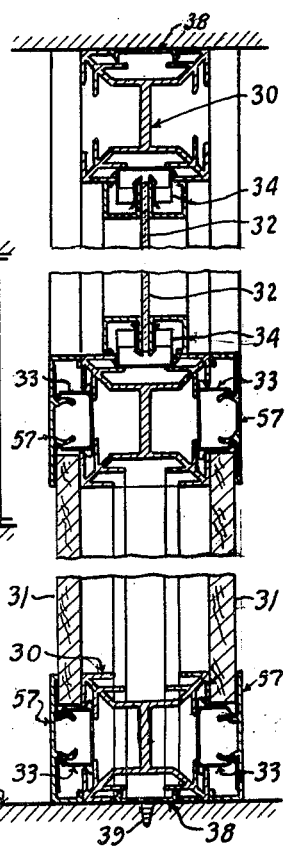
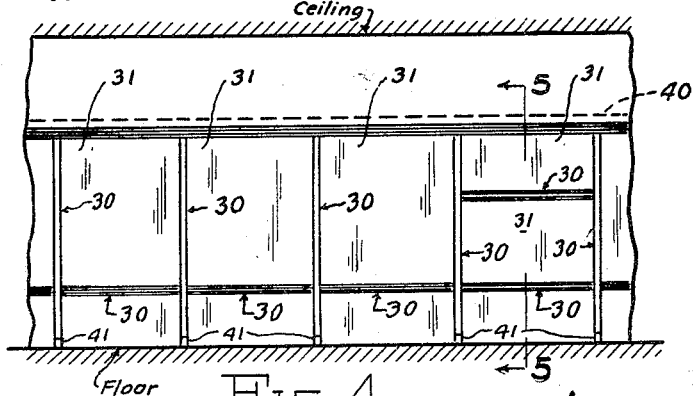
INVENTOR.
LEONARD O. DOWNES
BY
*ATTORNEYS*

July 6, 1965  L. O. DOWNES  3,193,061
STRUCTURAL PARTITION SYSTEM
Filed June 8, 1962  5 Sheets-Sheet 2
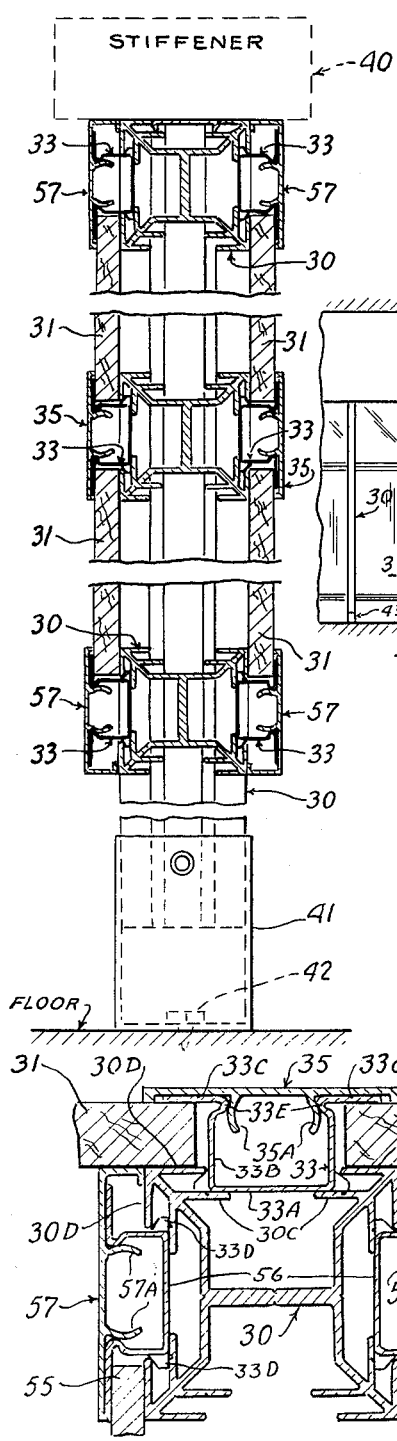
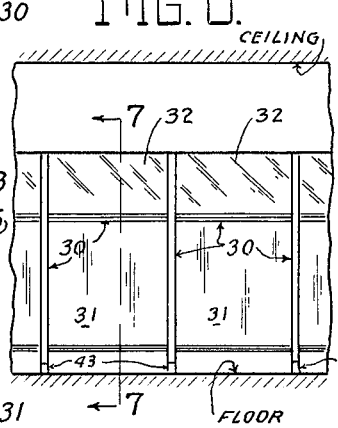
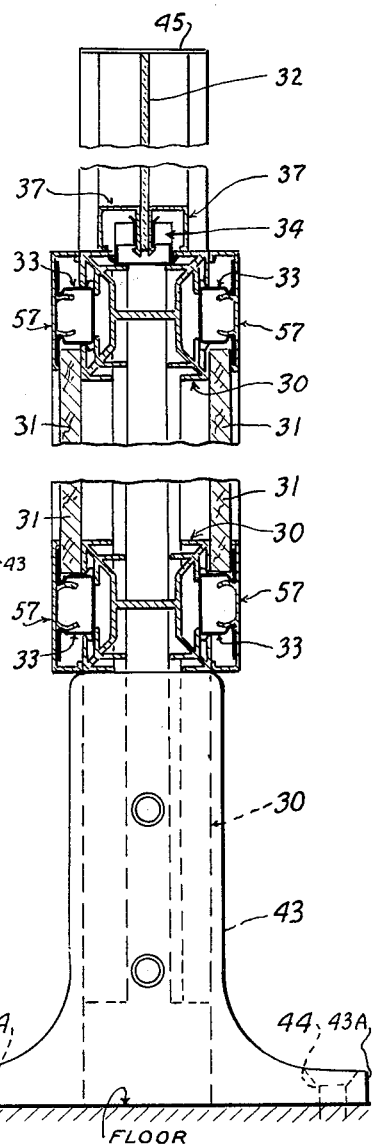
INVENTOR.
LEONARD O. DOWNES
BY
Hanke & Hanke
ATTORNEYS July 6, 1965 L. O. DOWNES 3,193,061
STRUCTURAL PARTITION SYSTEM
Filed June 8, 1962 5 Sheets-Sheet 3

INVENTOR.
LEONARD O. DOWNES
BY
ATTORNEYS

July 6, 1965    L. O. DOWNES    3,193,061
STRUCTURAL PARTITION SYSTEM
Filed June 8, 1962    5 Sheets-Sheet 4
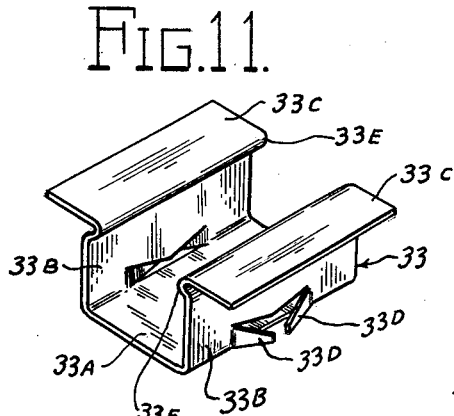
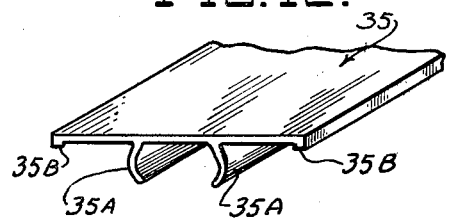
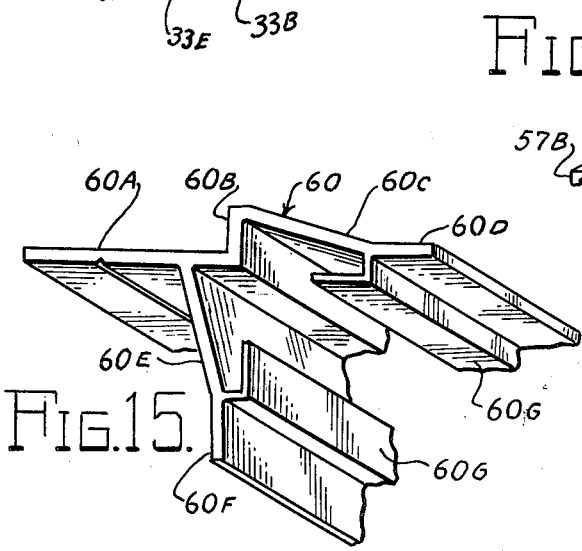
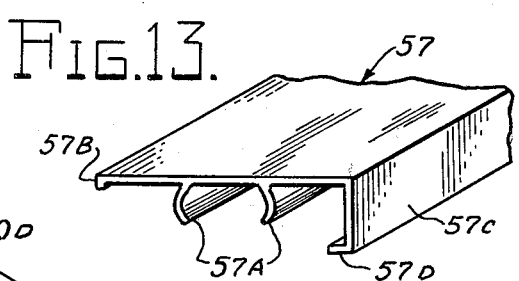
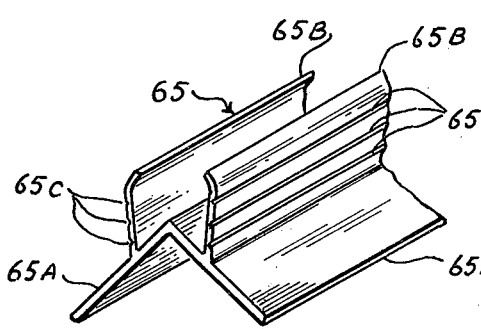
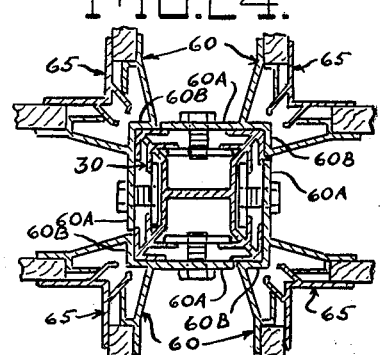
INVENTOR.
LEONARD O. DOWNES
BY
Hauke + Hauke
ATTORNEYS July 6, 1965 L. O. DOWNES 3,193,061
STRUCTURAL PARTITION SYSTEM
Filed June 8, 1962 5 Sheets-Sheet 5
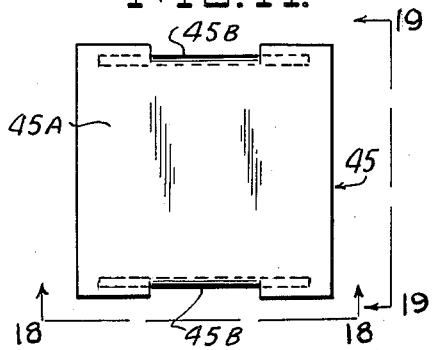
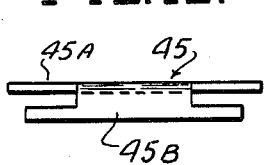
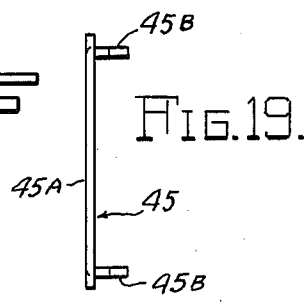
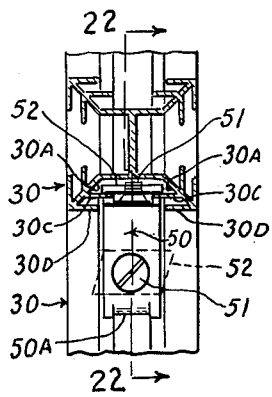
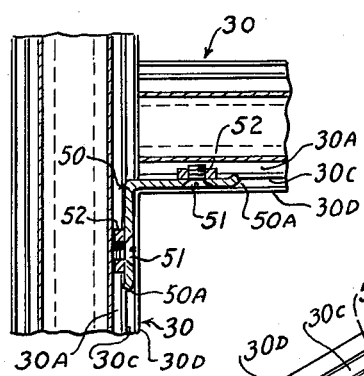
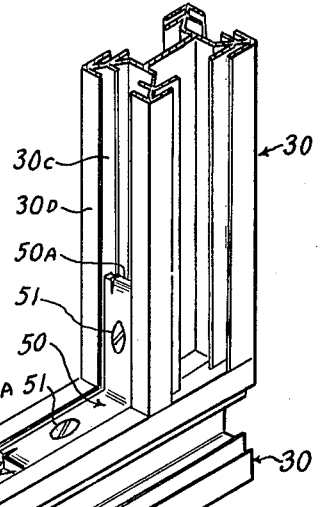
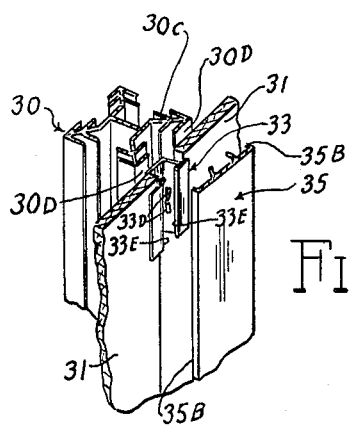
INVENTOR.
LEONARD O. DOWNES
BY
*Hauke & Hauke*
ATTORNEYS

United States Patent Office 3,193,061
Patented July 6, 1965

3,193,061
STRUCTURAL PARTITION SYSTEM
Leonard O. Downes, 4077 2nd St., Wayne, Mich.
Filed June 8, 1962, Ser. No. 201,019
13 Claims. (Cl. 189—34)

My invention relates to a partition system, and more particularly to a new system of readily assembled cooperating support structures for supporting and retaining panels of a variety of thicknesses and material superimposed over the open spaces formed by a unique framing structure.

In the development of partition systems heretofore, various limitations and disadvantages have been found to exist preventing a single system from serving many uses or being architecturally acceptable apart from specific installations.

Architecturally, panelling systems now in use, unless custom made, are generally unsatisfactory for most interiors since they lack the clean modern lines, finished joints and edges, and have various exposed brackets and miscellaneous connecting elements, screws, bolts and the like. Moreover, for practical reasons, most systems are unsatisfactory because they require skilled assemblers and the use of many tools, are not readily dismounted or altered when desired, and are not easily maintained.

An object of the present invention is to improve partition systems by combining new extrusion and connecting members permitting free and unobstructed assembly with panel support elements.

Another object of the invention is to facilitate partitioning by assembling new framing and supporting elements enabling the installation of a variety of panel configurations.

A further object of the invention is to provide architecturally acceptable interior partitioning by constructing new and readily connected framing and support elements operable to conceal all connections.

Yet another object of the invention is to expand the versatility of partition systems by providing improved framing and support elements adaptable for single and double panel partitioning with uniformity of appearance.

A still further object of the invention is to facilitate partition construction by providing new elements readily assembled with a minimum of tools.

For a more complete understanding of the invention, reference may be had to the accompanying drawings illustrating preferred embodiments of the invention in which like reference characters refer to like parts throughout the several views and in which FIG. 1 is a fragmentary elevational view of a partition assembly constructed according to a preferred embodiment of the invention.

FIG. 2 is a cross-sectional view taken substantially on the line 2—2 of FIG. 1.

FIG. 3 is a cross-sectional view taken substantially on the line 3—3 of FIG. 1.

FIG. 4 is a fragmentary elevational view of another partition assembly.

FIG. 5 is a cross-sectional view taken substantially on the line 5—5 of FIG. 4.

FIG. 6 is a fragmentary elevational view of yet another partition assembly.

FIG. 7 is a cross-sectional view taken substantially on the line 7—7 of FIG. 6.

FIG. 8 is a fragmentary cross-sectional view of a partition assembly juncture.

FIG. 11 is a perspective view of a panel retaining clip element adapted for assembly with the framing member of FIG. 10.

FIG. 12 is a fragmentary perspective end view of a molding batten strip adapted for supporting engagement with the clip element of FIG. 11.

FIG. 13 is a fragmentary perspective end view of another molding batten strip.

FIG. 14 is a fragmentary perspective end view of a batten strip adapted for assembly with the framing member of FIG. 10.

FIG. 15 is a fragmentary perspective end view of a panel corner support structure adapted for assembly with the framing member of FIG. 10.

FIG. 16 is a fragmentary perspective end view of a corner molding batten strip adapted for assembly with the support structure of FIG. 15.

FIG. 17 is an elevational plan view of a framing member end closure element.

FIG. 18 is an edge view of the element of FIG. 17 as viewed from the top side thereof.

FIG. 19 is an edge view of the element of FIG. 17 as viewed from the right side thereof.

FIG. 20 is a fragmentary perspective view of a framing member assembly adapted for use with the present panel constructions.

FIG. 21 is a fragmentary cross-sectional view of the framing member assembly of FIG. 20.

FIG. 22 is a cross sectional view taken on the line 22—22 of FIG. 21.

FIG. 23 is a fragmentary exploded perspective view illustrating the assembly of partition parts.

FIG. 24 is a cross-sectional view illustrating a four-wall junction assembly.

The structural framing members adapted for use in the present system, as new articles of manufacture, are more fully shown and described in my copending application Serial No. 201,032, filed June 8, 1962.

The basic framing system, utilizing the above members for framing in the spaces on which the panels of the present system are superimposed, is more completely shown and described in my copending application Ser. No. 201,021, filed June 8, 1962.

Another partitioning system, readily combined with, and architecturally and visually compatible with, the present system, is more fully disclosed in my copending application Ser. No. 201,024, filed June 8, 1962.

Door framing structure used with the above and the present partition system is illustrated and described more fully in my copending application Ser. No. 222,296, filed Sept. 10, 1962.

My copending applications Ser. No. 227,370, filed Oct. 1, 1962, and Ser. No. 222,294, filed Sept. 10, 1962, respectively cover the electrical fixture and shelf bracket assemblies devised for use in the present and other compatible systems.

Reference to the above copending applications will provide fuller appreciation of the broad versatility of the present system and its innumerable combinations.

Figure 10:
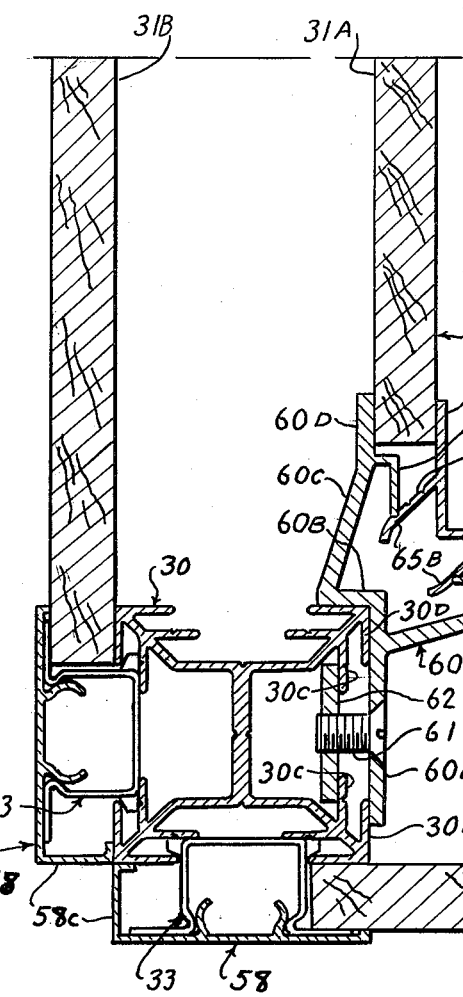
FIG. 10 is a fragmentary end view of a framing member used to support various partition assemblies.

FIGS. 1, 4 and 6 illustrate, respectively, a preferred floor-to-ceiling wall panel assembly, a preferred cubical assembly, and a preferred glazed rail assembly, each including vertical and horizontal framing members 30 similar in cross-section to that shown in FIG. 10. For convenience, all framing members shown in the present application are of this type, although other framing members, such as those in my copending application Ser. No. 201,024, filed June 8, 1962, may be used in various combinations as desired.

These assemblies are adapted to support partitions 31 of any preferred material, glass panels 32 and the like, by means of clips 33 and 34, and molding members 35, 37 and 57.

In the assembly of FIG. 2, the partitioning is double, with panels 31 carried on both sides of the framing members 30. In FIG. 3, the lower half is similarly constructed with double panels 31, while the upper half includes a single glass panel 32 disposed between the upper and intermediate horizontal framing member. The lowermost horizontal framing members 30 are preferably mounted on longitudinal batten strips 38, shown in FIG. 14, secured to the floor by any means such as screws 39.

In FIG. 5, showing a cubicle assembly with two sets of double panels 31 carried by upper, lower and intermediate framing members 30, a stiffener of wood or other material, suggested by the dotted line 40, may be used if desired along the upper framing member 30. The lower framing member 30 is spaced from the floor, and the vertical framing members 30 are supported by a post foot structure 41 secured to the floor by a screw 42 or the like.

FIG. 7, illustrating a glazed rail assembly, includes double panels 31 carried between the two horizontal framing members 30 and a single glass panel 32 extending upwardly from the upper member 30. The lower member 30 is spaced from the floor, and the lower ends of the vertical framing members 30 are supported by base structures 43 having feet 43A secured to the floor by any means such as screws 44. The upper ends of the vertical members 30 are preferably closed by end caps 45, illustrated in FIGS. 17–19.

FIG. 10 illustrates the preferred framing member 30 as comprising a longitudinal extrusion having a square periphery forming four flat sides each having a longitudinal recess. The sides of the recesses are each laterally slotted as at 30A and 30B to form inner and outer spaced parallel flanges 30C and 30D, the outer surfaces of the outer flanges 30D forming the aforesaid flat sides.

The flanges 30C and 30D are supported on angularity extending ends of legs 30E which, with a medial web 30F, have an H-shaped form in cross-section as shown.

Other preferred four sided extrusions, having different numbers of recesses and other basic cross-sectional forms, are shown and claimed as new articles of manufacture in my aforementioned copending application Ser. No. 201,032. The unique feature of these extrusions is the provision of the flanges 30C and 30D, the edges of the flanges 30C being more closely spaced, which enable certain structural supporting members to be secured to the inner flanges 30C without interfering with the assembly of the supported partitioning elements on the outer flanges 30D.

The assembly of the framing members 30 is illustrated in FIGS. 20–22. An angle bracket 50, of a width to pass between the more widely spaced outer flanges 30D and seat on the inner flanges 30C, has bent end portions 50A fitting between the edges of the inner flanges 30C to prevent displacement. The bracket 50 is clamped to the inner flanges 30C by means of screws 51 extending through the bracket 50 and threaded into nuts 52 disposed across the inner sides of the flanges 30C and extending into the slots 30A.

FIG. 8 illustrates the assembly of a partition juncture and demonstrates how panels of various thickness are mounted. As shown, panels 31 are disposed with their edges overlying the outer flanges 30D of one side of the member 30. The clip element 33, shown in perspective in FIG. 11, comprise a C-shaped resilient sheet metal element with a base web 33A seated on the inner flanges 30C, side webs 33B spaced to fit between the edges of the outer flanges 30D, extending out the thickness of the panels 31, and outwardly extending end portions 33C overlying the panel edges. Wedge-shaped elements 33D are cut in the side webs 33B to be forced outwardly into the spaces between the inner and outer flanges 30C and 30D.

The outer ends of the webs 33B are joined to the portions 33C by inwardly projecting heads 33E. The molding members 35 comprise flat longitudinal batten strip extrusions having inner bowed elements 35A adapted to snap between the beads 33E and be urged inwardly. The molding member batten strips are wider than the clips 33 and have inwardly turned edge ribs 35B which clamp against the outer surfaces of the panels 31. The clips 33 and members 35 thus cooperate to retain the panels 31, and the molding members 35 conceal both the clips 33 and the edges of the panels 31.

The thinner panels 55 of FIG. 8 are retained in similar fashion by clips 56 similar to the clip 33 but of shallower construction. Molding members 57 as seen in FIG. 13 are provided with inner elements 57A, similar to the aforesaid elements 35A of the member 35, with one edge rib 57B like the ribs 35B of the member 35 but with a second rib 57C extending inwardly and having a return-formed edge 57D abutting the outer flange 30D of the framing member 30.

Figure 9:
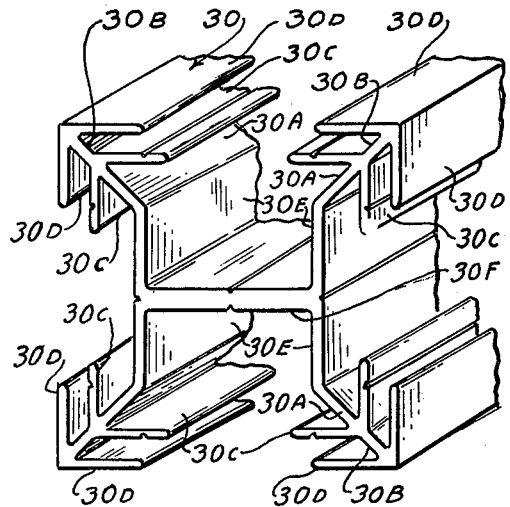
FIG. 9 is a fragmentary cross-sectional view of another partition assembly juncture.

FIG. 9 illustrates a double wall corner junction in which the outer panels 31B are secured to the member 30 by clip elements 33 and molding member battens 58 similar to the members 57 of FIGS. 8 and 13 but having greater depth of rib 58C to accommodate the thicker panels.

The inner corner panels 31C must be supported with their inner surfaces 31A in planes common with the outer adjoining side surfaces of the framing member 30. The member 30 is thus provided with a longitudinal internal extruded corner molding 60, shown in perspective in FIG. 15.

The molding 60 comprises a flat base 60A adapted to overlie the framing member recess and clamped to the outer flanges 30D by means of screws 61 secured with nuts 62 disposed inwardly of the inner flanges 30C. One side of the base is formed at right angles as at 60B complimentary with the corner of the member 30 and then extends angularly as at 60C, terminating in a side flange 60D having its outer surface coplanar with the inner surface of the base 60A.

A second angular portion 60E extends from the outer face of the base 60A and terminates in a flange 60F having its outer surface coplanar with the inner surface of the portion 60B. Retainer portions 60G extend from the junctures of portions 60C and 60E respectively with portions 60D and 60F. The ends of the portions 60G and 60F are preferably disposed in normally intersecting planes as shown.

Extruded finish corner moldings 65 comprise right angled portions 65A and inwardly extending resilient portions 65B having longitudinal spaced grooves 65C adapted to snap over the edges of the internal corner molding portions 60G. The grooves 65C are spaced such that the molding portions 65A can operate to clamp different thicknesses of panels 31 against the respective internal molding portion 60D and 60F.

FIG. 24 illustrates the use of the internal and external corner moldings 60 and 65 to assemble a junction of four double walls. The width of a portion 60A plus the width of the portion 60B of an adjacent molding are such that they will not interfere when overlying a single side of the framing member 30.

It will be noted that the assembly of the corners is ideal also for forming a wall-ceiling junction with a horizontally disposed framing member 30.

The molding members 60, being concealed, may be used in short sections as supporting clips rather than as longitudinal members extending the length of the exposed members 65.

FIG. 23 illustrates in perspective the present assembly. The panels 31 are set into place overlying the outer flanges 30D of the framing member 30 and the clips 33 are inserted into the recess, intermediate the panel edges near their corners, seating on the inner flanges 30C. The portions 33D are then pushed out with any convenient tool such as a screw-driver to wedge between the inner and outer flanges, locking the clips in place.

The molding batten strip 35 is next snapped into place, locking with the beads 33E, the edge ribs 35B clamping on the surfaces of the panels 31 and concealing the clips 33.

The batten strips 38, shown in FIG. 14, can be utilized to close an open framing member recess and, if secured to floor or ceiling as in FIGS. 2 and 3, will retain framing members in place. The edges 38A of these batten strips are adapted to snap between the edges of the framing member outer flanges 30D and to seat on the inner flanges 30C. A longitudinal center groove 38B is provided to accurately locate screw holes as needed.

The end caps 45, shown in FIGS. 17–19, comprise flat plates 45A having projecting feet 45B at opposite sides and adapted to be wedged readily into the recesses 30B between the inner and outer flanges of the end of the framing member.

It will be noted that the combination of the present partition system in which the panels overlie the one flat side of the framing member are compatible with the system shown in my copending application Ser. No. 201,024 in which each panel extends from and in a plane normal with one of the flat sides, as seen in FIGS. 3 and 7 of that application.

The particular advantage of these systems is that with only a relatively few parts, a great variety of architecturally desirable partition combinations are available, and the essence of the inventions in all my copending cases is in the way in which the unique framing members, clips and molding members combine and coact to support wide varieties of single and double panels, all of which are assembled with a minimum amount of fastening devices so that changes and disassembly is more readily achieved.

It will be apparent to one skilled in the art to which the present invention pertains that many changes and modifications may be made therein without departing from the spirit of the invention as expressed by the scope of the appended claims.

I claim:
1. In a partition system,
  (a) a longitudinal framing member having at least one flat side and a substantial medial longitudinal recess being formed in said flat side,
  (b) inner and outer parallel flanges extending from opposite sides of said recess, said outer flanges forming said flat side and said inner flanges extending farther inwardly than said outer flanges,
  (c) a panel member having an edge disposed adjacent the portion of said flat side, formed by one of said outer flanges,
  (d) supporting means connecting said edge and said framing member and comprising a clip element having a portion insertable into said recess and being supported by said inner flanges and means resiliently extending intermediate said flanges whereby said clip element is securely locked to said framing member,
  (e) said clip element further comprising a portion resiliently engaging a side portion of said panel member to clamp said panel member against said framing member flat side.

2. The partition system as defined in claim 1 and including a molding element and in which said clip element has means resiliently engaging said molding element and urging same to clamp against said side portion of said panel member.

3. The partition system as defined in claim 2 and in which
  (a) the side adjacent the edge of said panel member overlies and abuts only one side portion of said framing member flat side, and
  (b) said molding element has one side only engaging said panel and another side engaging the side of said framing member flat side which is not underlying said panel.

4. In a partition system
  (a) a longitudinal framing member having at least one flat side provided with a longitudinal medial recess and inner and outer parallel flanges extending from opposite sides of said recess, said outer flanges forming said flat side and said inner flanges extending farther inwardly than said outer flanges,
  (b) a panel member having a side surface portion overlying one edge of said flat side and engaging same, said panel being disposed in a plane substantially parallel to the plane of said flat side,
  (c) a clip element insertable into said recess and supported by said inner flanges and having portions resiliently extending intermediate said inner and outer flanges to lock said clip element to said framing member,
  (d) said clip element having a portion extending from said recess and engaging said panel member to resiliently clamp said side surface portion of said panel member against said flat side of said framing member, and
  (e) a molding element engaged with and supported by said clip element in position to overlie the adjacent edge portion of said panel member.

5. The partition system as defined in claim 4 and in which said clip element has means resiliently engaging said molding element and clamping same against the outward facing surface of said panel member adjacent said edge portion thereof.

6. In a partition system
  (a) a longitudinal framing member having at least one flat side provided with a longitudinal medial recess and inner and outer parallel flanges extending from opposite sides of said recess, said outer flanges forming said flat side and said inner flanges extending farther inwardly than said outer flanges,
  (b) a panel member having a side surface portion overlying one edge of said flat side and engaging same, said panel being disposed in a plane substantially parallel to the plane of said flat side,
  (c) a clip member insertable into said recess and comprising a member substantially C-shaped in lateral cross-section having a base web engaging said innermost flanges to be supported thereby, and spaced parallel side webs,
  (d) said side webs extending outwardly from said recess and being provided with oppositely extending flanges, at least one of said flanges engaging said panel member to resiliently clamp said side surface portion of said panel member against said flat side of said framing member,
  (e) said side webs also being provided with means resiliently extending intermediate said flanges whereby said clip element is secured to said framing member, and
  (f) a molding element carried by said clip element.

7. The partition system as defined in claim 6 and in which
  (a) said clip element side webs have longitudinal beads inwardly extended and disposed in a common plane parallel with said base web,
  (b) said molding element having a flat portion overlying said panel edge and flanges extending between and resiliently retained by said clip element beads.

8. The partition system as defined in claim 6 and in which
  (a) said molding member comprises an elongated batten strip having means engageable with and retained by said clip element, and side portions overlying said clip element flanges,
  (b) the outer edge of at least one of said batten side portions engaged with a panel outer surface, and
  (c) said clip and batten strip means cooperable to urge said outer edge of the batten strip against said panel surface.

9. The partition system as defined in claim 8 and in which said batten strip edges have ribs extending inwardly toward said framing member and at least one rib abutting said panel surface.

10. The partition system as defined in claim 9 and in which said batten strip is symmetrical with respect to a longitudinal center line whereby said edge ribs are adapted to abut panels overlying each edge of said framing member flat side.

11. The partition system as defined in claim 8 and in which
  (a) said batten strip edges have ribs extending inwardly toward said framing member,
  (b) one of said ribs being short and abutting said panel surface,
  (c) the other of said ribs being relatively longer and abutting the edge of said framing member flat side not overlaid by said panel edge.

12. The partition system as defined in claim 11 and in which the width of said batten strip between edges is equal to the width of said framing member flat side.

13. In a partition system,
  (a) a longitudinal framing member having at least two adjacent flat sides disposed in planes substantially normal with respect to each other to define a longitudinal edge,
  (b) a support member secured to said framing member and having an interior corner formed complementary to and engaging said edge of said framing member, said support member having portions defining a pair of spaced right angled surface portions and a longitudinal recess intermediate said surface portions,
  (c) a first and a second panel member respectively seated on said surface portions and being normally disposed parallel with said framing member flat surfaces,
  (d) said recess being defined by a pair of flanges extending one toward the other and being disposed in planes respectively parallel with said framing member flat surfaces, and
  (e) a clamping member being provided with spaced and notched tongue portions extending between and respectively resiliently engaging said flanges to clamp said clamping member to said support member and arm portions respectively engaging said panel members to clamp same against said surface portions of said support member.

References Cited by the Examiner

UNITED STATES PATENTS 2,094,607  10/37  Kotrbaty _____ 189—34

FOREIGN PATENTS 526,779  3/54  Belgium.
468,582  10/50  Canada.
790,903  2/58  Great Britain.

RICHARD W. COOKE, JR., *Primary Examiner.*
JACOB L. NACKENOFF, *Examiner.*